(12) United States Patent
Gonzalez et al.

(10) Patent No.: US 10,385,535 B2
(45) Date of Patent: Aug. 20, 2019

(54) BRACKET ASSEMBLY FOR LINKAGE ASSEMBLIES OF MACHINES

(71) Applicant: Caterpillar Inc., Peoria, IL (US)

(72) Inventors: Andres Gonzalez, Waco, TX (US); Austin Neathery, Waco, TX (US); Lauritz P Pillers, II, McGregor, TX (US)

(73) Assignee: Caterpillar Inc., Deerfield, IL (US)

( * ) Notice: Subject to any disclaimer, the term of this patent is extended or adjusted under 35 U.S.C. 154(b) by 320 days.

(21) Appl. No.: 15/349,015

(22) Filed: Nov. 11, 2016

(65) Prior Publication Data

US 2018/0135271 A1 May 17, 2018

(51) Int. Cl.
| | | |
|---|---|---|
| *E02F 3/36* | (2006.01) | |
| *F16C 29/02* | (2006.01) | |
| *E02F 3/38* | (2006.01) | |
| *E02F 3/32* | (2006.01) | |

(52) U.S. Cl.
CPC ............. *E02F 3/3604* (2013.01); *E02F 3/38* (2013.01); *F16C 29/02* (2013.01); *E02F 3/32* (2013.01)

(58) Field of Classification Search
CPC E02F 9/006; E02F 3/36; E02F 3/3686; Y10T 403/7005; Y10T 403/7007
See application file for complete search history.

(56) References Cited

U.S. PATENT DOCUMENTS

| | | | | |
|---|---|---|---|---|
| 4,813,163 | A * | 3/1989 | Livingston | E02F 3/3604 37/444 |
| 5,927,665 | A * | 7/1999 | Grabnic | E02F 3/3604 172/272 |
| 5,975,604 | A | 11/1999 | Wolin et al. | |
| 6,364,561 | B1 * | 4/2002 | Droegemueller | E02F 3/3636 403/4 |
| 6,662,681 | B2 * | 12/2003 | Crane | E02F 3/3613 248/200 |
| 6,938,514 | B1 * | 9/2005 | Crane | E02F 3/3613 248/200 |
| 7,204,656 | B2 * | 4/2007 | Bjuhr | E02F 3/3636 403/4 |
| 7,805,865 | B2 | 10/2010 | Paske | |
| 7,966,754 | B2 * | 6/2011 | Starykowicz | E02F 3/3604 37/443 |
| 7,984,575 | B2 * | 7/2011 | Robl | E02F 3/3622 172/273 |

(Continued)

FOREIGN PATENT DOCUMENTS

| | | | | |
|---|---|---|---|---|
| CA | 2234893 A1 * | 10/1999 | | E02F 3/3613 |
| GB | 2429197 A * | 2/2007 | | B66F 9/065 |

(Continued)

*Primary Examiner* — Matthieu F Setliff
(74) *Attorney, Agent, or Firm* — Hibshman Claim Construction PLLC

(57) ABSTRACT

A bushing for a bracket assembly of a linkage assembly of a machine includes a cylindrical portion with an end, and a number of holes arranged on and along an axial direction of cylindrical portion, and being longitudinally spaced apart from each other. The bracket assembly includes a plate having an opening, and the cylindrical portion of the bushing is configured to be inserted into and positioned within the opening. The holes facilitate multiple positions of the end relative to the plate.

17 Claims, 8 Drawing Sheets

(56) References Cited

U.S. PATENT DOCUMENTS

| | | | | |
|---|---|---|---|---|
| 8,434,739 B1* | 5/2013 | Connolly | ............... | B66F 15/00 |
| | | | | 254/130 |
| 8,869,437 B2* | 10/2014 | Robl | .................... | E02F 3/3618 |
| | | | | 37/468 |
| 9,228,314 B2* | 1/2016 | Robl | .................... | E02F 3/3663 |
| 2003/0103804 A1* | 6/2003 | Bjuhr | .................... | E02F 3/3636 |
| | | | | 403/321 |
| 2003/0131682 A1* | 7/2003 | Crane | .................. | E02F 3/3613 |
| | | | | 403/167 |
| 2005/0286968 A1* | 12/2005 | Loebner | ................. | F16B 7/105 |
| | | | | 403/109.1 |
| 2014/0317935 A1 | 10/2014 | Clemons | | |
| 2017/0335539 A1* | 11/2017 | Tindal | .................. | E02F 3/3604 |
| 2018/0135272 A1* | 5/2018 | Gonzalez | .............. | E02F 3/3604 |

FOREIGN PATENT DOCUMENTS

| | | | | |
|---|---|---|---|---|
| WO | 2007070941 | | 6/2007 | |
| WO | WO-2009102223 A1 * | | 8/2009 | ............ E02F 3/3613 |

* cited by examiner

US 10,385,535 B2

BRACKET ASSEMBLY FOR LINKAGE ASSEMBLIES OF MACHINES

TECHNICAL FIELD

The present disclosure relates to a bracket assembly for coupling an arm of a machine to an implement. More particularly, the present disclosure relates to a bracket assembly having a bushing to facilitate attachment of different arms to an implement.

BACKGROUND

Machines, such as an excavator, generally include a linkage assembly and an implement coupled to the linkage assembly to perform useful work. Typically, a bracket assembly is used to mount the implement to the linkage assembly. On occasions, the implement may be required for use on different machines, and each such different machine may have linkage assemblies of a different size and specification. To enable an attachment of the implement to such linkage assemblies, different bracket assemblies, or bracket assemblies with differently sized bushings, may be required. As a result, a large number of bracket assemblies or differently sized bushings may need to be stocked by operators or service technicians for using the implement with different machines. Such a practice increases costs, effort, and overhead.

U.S. Pat. No. 5,975,604 ('604 reference) relates to grapples for use in grasping, raking, lifting, or moving objects in logging operations, construction, demolition, and other industrial fields. The '604 reference discusses tapered lock bushings to releasably mount pins for coupling a grapple with a linkage assembly. Each tapered lock bushing is split longitudinally by a slot and is inserted into an opening around the pins. Screws are inserted between the bushing and opening to adjust the diameter of the bushing inside the opening. This enables use of a pin of a different diameter with a mounting system having openings of different diameters.

SUMMARY OF THE INVENTION

In one aspect, the disclosure is directed towards a bushing for a bracket assembly of a linkage assembly of a machine. The bracket assembly includes a plate having an opening. The bushing includes a cylindrical portion including an end and a number of holes arranged on and along an axial direction of cylindrical portion and being longitudinally spaced apart from each other. The cylindrical portion is configured to be inserted and positioned into the opening. The plurality of holes facilitates multiple positions of the end relative to the plate.

In another aspect, the disclosure relates to a bracket assembly for coupling an implement to an arm of a machine. The bracket assembly includes a bracket with a plate having an opening. Further, the bracket includes a collar that extends from the plate and which is co-axial with the opening. The collar includes an aperture. Further, the bracket assembly includes a bushing adapted to be inserted and positioned into the opening. The bushing includes a cylindrical portion with an end, and a plurality of holes arranged on and along an axial direction of the cylindrical portion. The plurality of holes is longitudinally spaced apart from each other. The plurality of holes facilitates multiple positions of the end relative to the plate by selectively aligning and engaging each of the plurality of holes with the aperture.

In yet another aspect, the disclosure is directed to a linkage assembly for a machine. The linkage assembly includes an arm and a bracket pivotally coupled to the arm. The bracket is configured to couple an implement to the arm, and includes a base structure configured to couple to the implement. The bracket further includes a plate with an opening, the plate is pivotally coupled with the arm. Also, the bracket includes a collar having an aperture and extending from the plate and co-axial with the opening. The linkage assembly also includes a bushing inserted and positioned into the opening. The bushing includes a cylindrical portion with an end, and a plurality of holes arranged on and along an axial direction of the cylindrical portion. The holes are longitudinally spaced apart from each other. The linkage assembly further includes a pin that couples the arm with the bracket and inserted through the opening. The pin includes a slot. Moreover, the linkage assembly also has a retainer inserted through each of the aperture, one of the plurality of holes, and the slot to retain the pin with the bracket.

DETAILED DESCRIPTION

Figure 1:
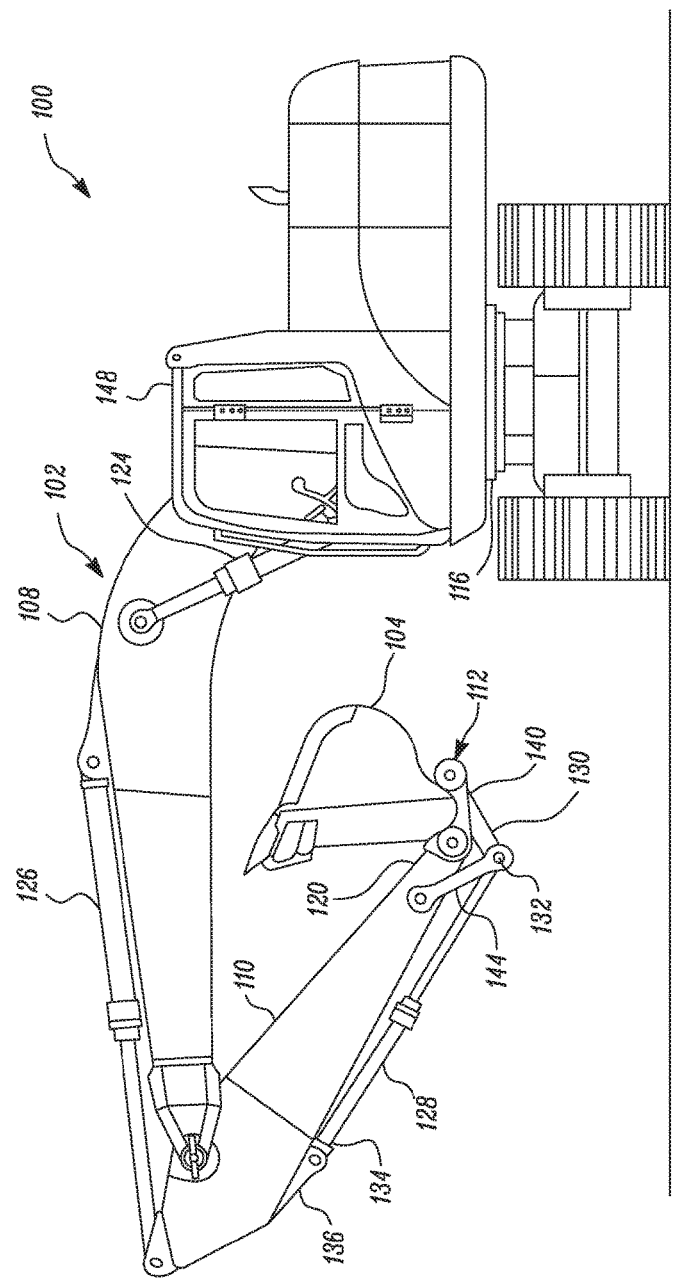
FIG. 1 is an exemplary machine having a linkage assembly, in accordance with the concepts of the present disclosure.

Referring to FIG. 1, a machine 100 is shown. The machine 100 may be configured to perform various operations at a worksite, including loading, unloading, and the like. The machine 100 is depicted as an excavator, including a linkage assembly 102 for manipulating an implement 104. However, the machine 100 is not limited to being an excavator, and similar other work machines may be contemplated. For example, the machine 100 may also represent a forest machine, a loader, or any other similar type of work machine that may use any of the other widely available linkages or arms of the art. The implement 104 may be a bucket. However, the implement 104 may also represent and/or include a grapple, a ram, a fork, a thumb, and similar such work units, that are configured to perform different operations on different work materials at different worksites. Work materials may include, but are not limited to, boulders, pipes, trees, structural components, various disintegrated particles, soil, and the like.

The linkage assembly 102 may include one or more arms (108, 110), and a bracket assembly 112 configured to couple the implement 104 to the one or more arms (108, 110). The arms (108, 110) may be categorized into and include one or both of a boom 108 and a stick 110. The boom 108 may be coupled to a frame 116 of the machine 100, while the stick 110 may be pivotally coupled to the boom 108, in a known manner. An end 120 of the stick 110 may be pivotally coupled to the implement 104 via the bracket assembly 112. Although the boom 108 and the stick 110 have been disclosed, it is possible for the linkage assembly 102 to include more or lesser number of arms.

Figure 2:
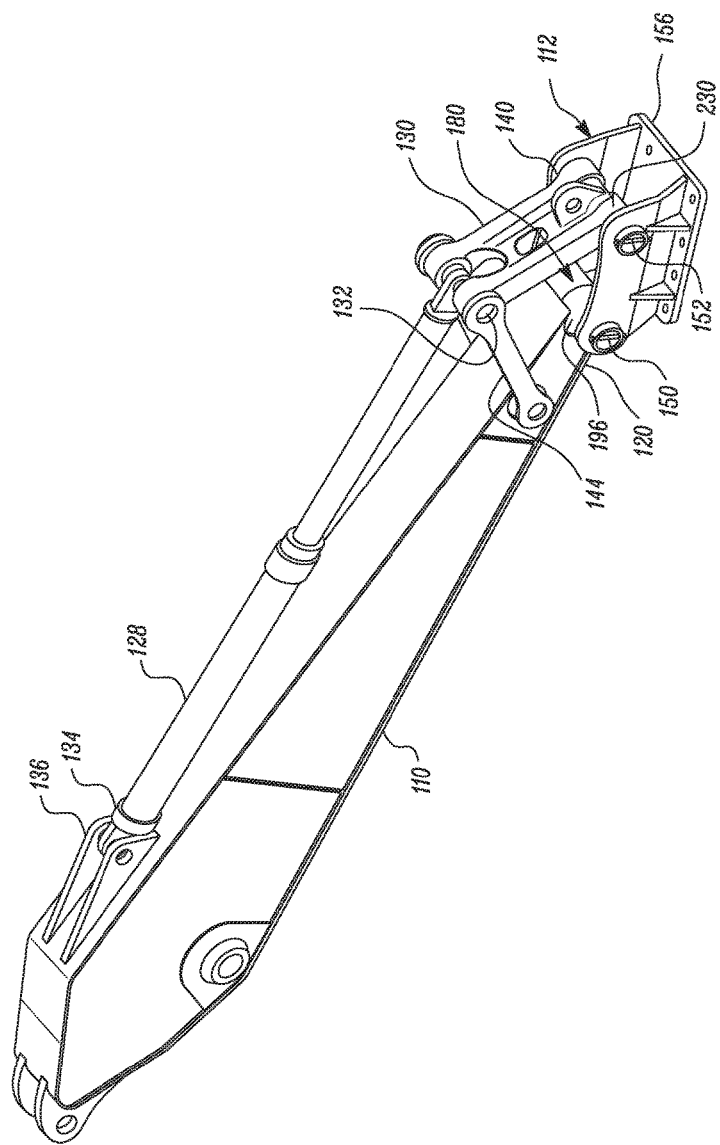
FIG. 2 is a stick of the linkage assembly depicted in conjunction with a bracket assembly of the linkage assembly, in accordance with the concepts of the present disclosure.

Referring to FIGS. 1 and 2, one or more boom lift actuators 124 may be operably and pivotally coupled to the boom 108 and the machine 100 (such as to the frame 116 of the machine 100). In that manner, the boom lift actuators 124 may facilitate an actuation and rotation of the boom 108 with respect to the machine 100. Such a rotation helps to raise and lower the linkage assembly 102, as a whole. Similarly, a stick extension actuator 126 is operably coupled to the boom 108 and the stick 110 to rotate the stick 110 with respect to the boom 108. Further, the linkage assembly 102 may include an implement articulation actuator 128 and an attachment member 130 that are pivotally coupled to each other at a common point 132 of rotation. One end 134 of the implement articulation actuator 128 may be pivotally coupled to a portion 136 of the stick 110, while an end 140 of the attachment member 130 may be pivotally coupled to the implement 104 (via the bracket assembly 112). A link rod 144 may be coupled between the stick 110 and the common point 132 so that an actuation of the implement articulation actuator 128 may cause the implement 104 to execute a pivotal movement relative to the stick 110. Each of the above noted actuators 124, 128, 128 may be or include hydraulic actuators that are actuated by use of a hydraulic fluid. To this end, one or more operators may be stationed within an operator cab 148 of the machine 100 to use one or more levers and/or known input devices (not shown) to actuate the actuators 124, 126, 128. Reference will now be made in detail to specific embodiments or features, examples of which are illustrated in the accompanying drawings. Wherever possible, the same reference numbers will be used throughout the drawings to refer to the same or the like parts.

Figure 3:
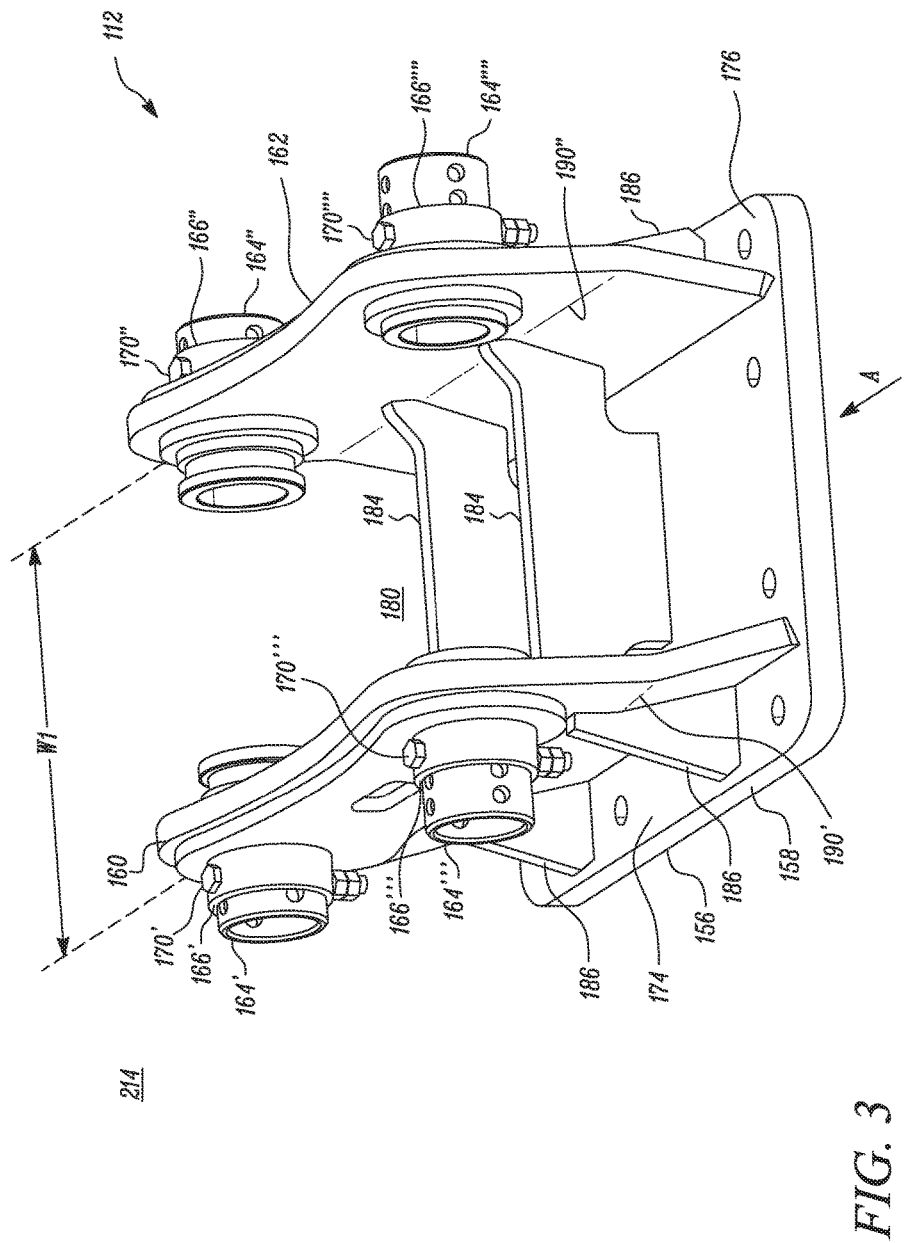
FIG. 3 is an assembled view of the bracket assembly depicted with certain surrounding components removed, in accordance with the concepts of the present disclosure.
Figure 4:
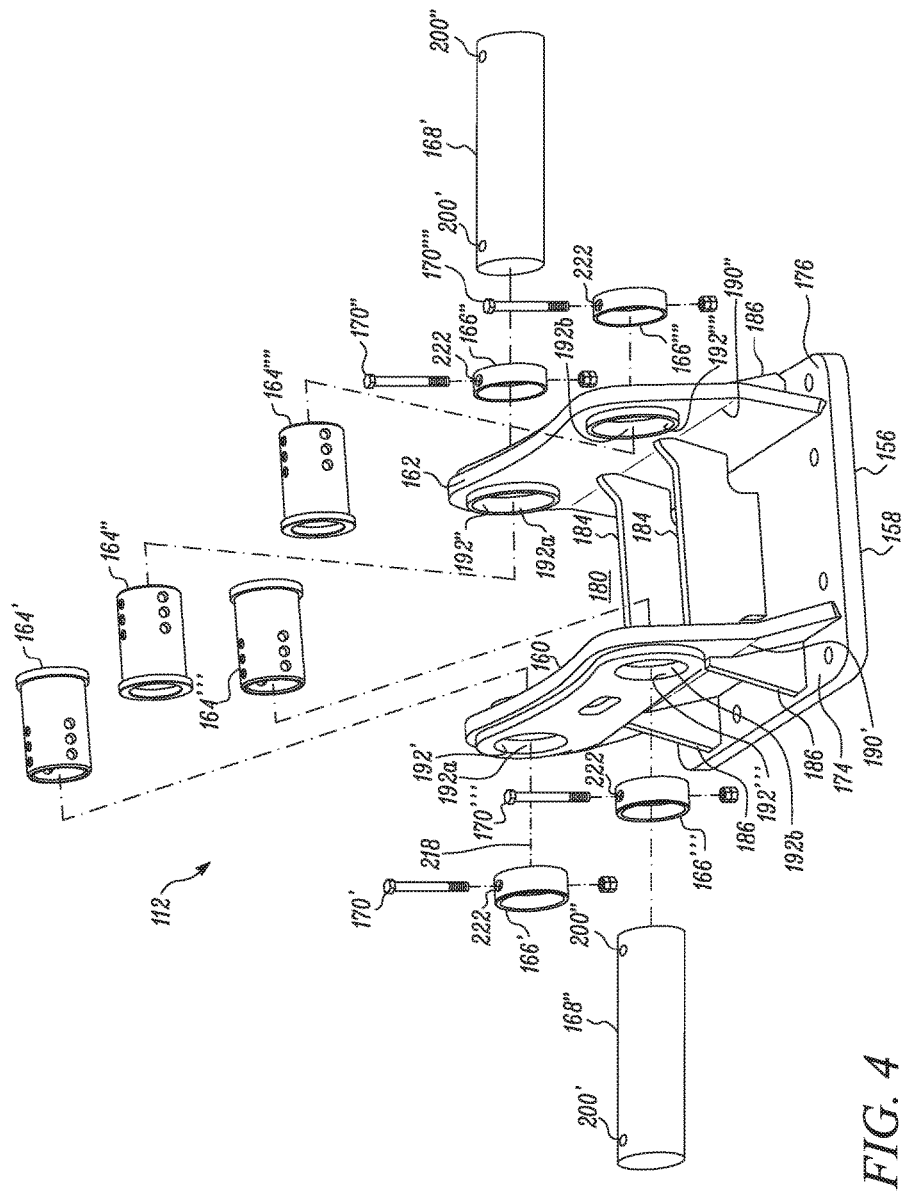
FIG. 4 is an exploded view of the bracket assembly, in accordance with the concepts of the present disclosure.

Referring to FIGS. 2, 3, and 4, the bracket assembly 112 is discussed. The bracket assembly 112 facilitates a coupling of the implement 104 with the stick 110, and also with different such arms of different machines. The bracket assembly 112, as a whole, is pivotally coupled to the end 120 of the stick 110 of the linkage assembly 102 at a first pivotal connection 150, and is also pivotally coupled relative to the attachment member 130 at a second pivotal connection 152. The first pivotal connection 150 of the bracket assembly 112 facilitates a rotation between the stick 110 and the implement 104, while the second pivotal connection 152 facilitates a rotation between the attachment member 130 and the implement 104. Further, as a whole, the bracket assembly 112 is fixedly connected to the implement 104 (see FIG. 1) via threaded fasteners, for example.

The bracket assembly 112 includes a bracket 156 having a base structure (or a base plate 158) and one or more side plates 160, 162. Further, the bracket assembly 112 includes one or more bushings 164 (exemplarily four in number—164', 164'', 164''', 164''''), one or more collars 166 (exemplarily four in number—166', 166'', 166''', 166''''), a couple of pins 168 (or pivot pins 168—exemplarily two in number, see FIG. 4—168', 168''), and one or more fastener pins 170 (exemplarily four in number—170', 170'', 170''', 170''''), an arrangement of each of which is set out below.

The side plates 160, 162 are exemplarily two in number—i.e. including a first side plate 160 and a second side plate 162. Although not limited, each of the plates 160, 162 are substantially planarly formed components. The base plate 158 is configured to be coupled to the implement 104 via threaded fasteners (not shown), and may include a first edge portion 174 and a second edge portion 176. The first side plate 160 may be coupled to the base plate 158 at the first edge portion 174, while the second side plate may 162 be coupled to the base plate 158 at the second edge portion 176. In an embodiment, the first side plate 160 and the second side plate 162 are parallel and spaced apart from each other when they are respectively coupled to the first edge portion 174 and the second edge portion 176. Both the first side plate 160 and the second side plate 162 may be perpendicular to the base plate 158, and in so doing, an arrangement of the side plates 160, 162 and the base plate 158 impart a substantial box-like cross-section to the bracket 156 when viewed in a direction defined along the edge portions 174, 176 (see direction, A). Further, an inner space 180 is defined between the first side plate 160 and the second side plate 162.

As shown in the depicted embodiment, the bracket 156 may also include a number of reinforcement structures (or reinforcement members 184) and a number of ribs 186. For example, two reinforcement members 184 are coupled in between the first side plate 160 and the second side plate 162, although more or less reinforcement members 184 are possible. The reinforcement members 184 may also be connected to the base plate 158, thus inflexibly connecting the plates 160, 162 to each other. Further, the ribs 186 may be applied to strengthen connections between the side plates 160, 162 and the base plate 158, in a known manner. As shown, the side plates 160, 162 include a fold line 190', 190'' provided substantially parallely along a length of each of the side plates, i.e. in a direction (see direction, A) defined by first edge portion 174 and the second edge portion 176, respectively, and which is provided for structural rigidity. In some implementations, a coupling between each of the side plates 160, 162, the base plate 158, the reinforcement members 184, and the ribs 186, is attained by welding. It may be contemplated, however, that such a coupling may be attained by various other known methods.

The first side plate 160 includes a first opening 192' and the second side plate 162 includes a second opening 192''. The first opening 192' is aligned to the second opening 192'', defining a first pair of aligned openings 192a of the bracket 156. Similarly, first side plate 160 includes a third opening 192''' and the second side plate 162 includes a fourth opening 192''''. The third opening 192''' is aligned to the fourth opening 192'''', defining a second pair of aligned openings 192b of the bracket 156.

Figure 6A:
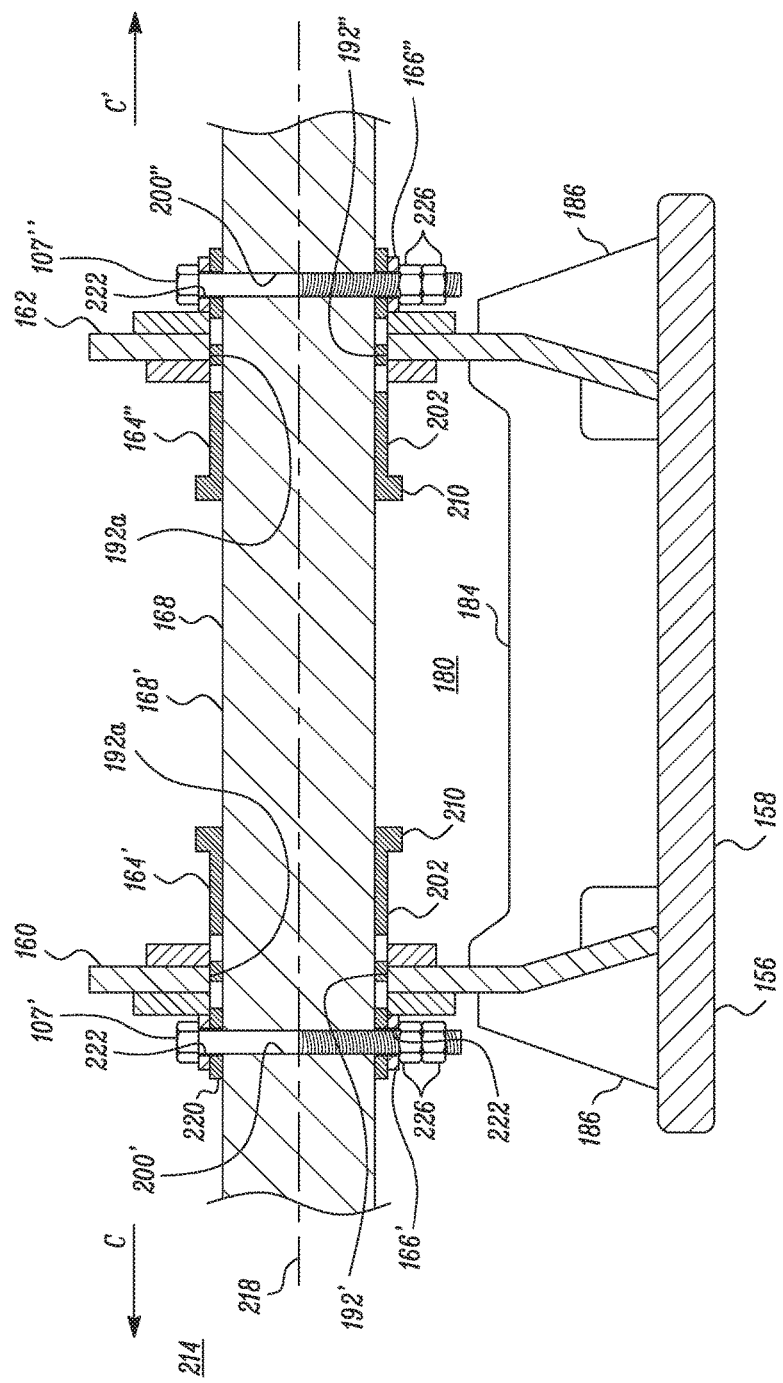
FIGS. 6A, 6B, and 6C, are depictions of various positions of the bushings relative to the bracket assembly, in accordance with the concepts of the present disclosure.
Figure 6B:
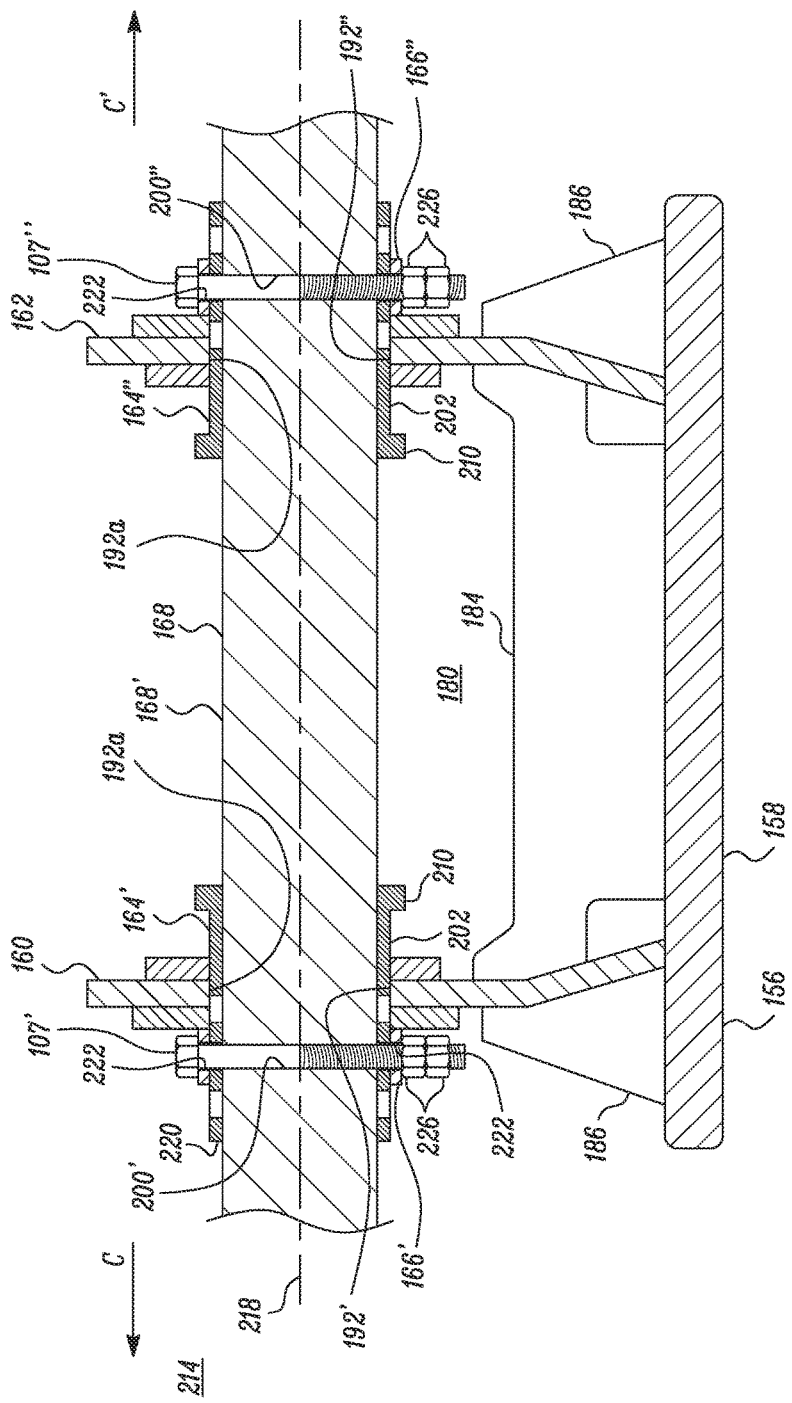
Figure 6C:
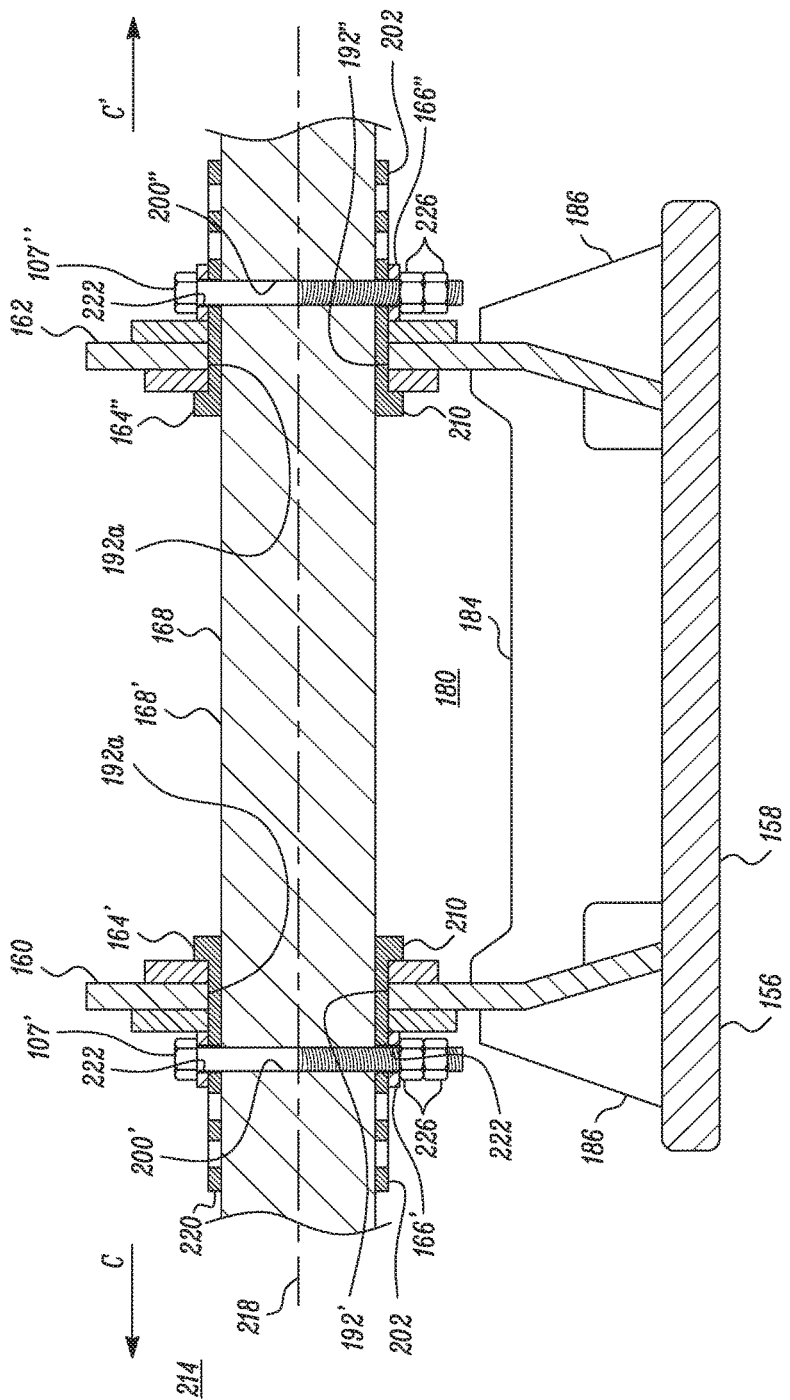

Each of the pivot pins 168', 168'' may be solid cylindrical shafts, adapted to couple the arm (stick 110) with the bracket 156. A first pivot pin 168' among the pivot pins 168', 168'' may be inserted through the first pair of aligned openings 192a, and in turn be engaged to a pin receiving portion 196 (FIG. 2) of the end 120 of the stick 110 that is extended into the inner space 180. In so doing, the first pivot pin 168' couples the side plates 160, 162, and in turn the bracket 156, to the end 120 of the stick 110—forming the first pivotal connection 150. Similarly, a second pivot pin 168'' among the pivot pins 168', 168'' may be inserted through the second pair of aligned openings 192b to couple the bracket 156 to the attachment member 130—forming the second pivotal connection 152. Further, the first pivot pin 168' may include, but not limited to, two slots 200', 200'' (FIGS. 6A, 6B, and 6C). Each of the slots 200', 200'' may be diametrically extended across the first pivot pin 168'. Moreover, the slots 200', 200'' may be symmetrical about a common axis 218 of the first pivot pin 168' and the openings 192', 192''. Similarly, the second pivot pin 168" may include similar slots (not shown), also diametrically extended across each of the second pivot pin 168".

The bushings 164, which may be exemplarily four in number, as already noted, may include and be categorized into a first bushing 164', a second bushing 164", a third bushing 164''', and a fourth bushing 164''''. The first bushing 164' may be configured to be inserted and positioned into the first opening 192'; the second bushing 164" may be configured to be inserted and positioned into the second opening 192"; the third bushing 164''' may be configured to be inserted and positioned into the third opening 192'''; and the fourth bushing 164'''' may be configured to be inserted and positioned into the fourth opening 192''''. The first bushing 164' may form an interface between the first opening 192' and the first pivot pin 168'; the second bushing 164" may form an interface between and the second opening 192" and the first pivot pin 168'; the third bushing 164''' may form an interface between the third opening 192''' and the second pivot pin 168"; and the fourth bushing 164'''' may form an interface between the fourth opening 192'''' and the second pivot pin 168". Further description set out below may include discussions pertaining to an assembly between the first bushing 164', the first opening 192', and the first pivot pin 168' alone. However, aspects of those discussions may be equivalently applied to an assembly between the second bushing 164", the second opening 192", and the first pivot pin 168', an assembly between the third bushing 164''', the third opening 192''', and the second pivot pin 168", and an assembly between the fourth bushing 164'''', the fourth opening 192'''', and the second pivot pin 168". For ease in reference and understanding, the first bushing 164' may be simply referred to as a bushing 164, and similarly, the first opening 192' may be referred to as opening 192, and the first pivot pin 168' may be referred to as pivot pin 168. Additionally, the first side plate 160 may also be solely referred to as a plate 160. Details of the bushing 164 may be applicable to each of the bushings 164', 164", 164''', 164''''.

Figure 5:
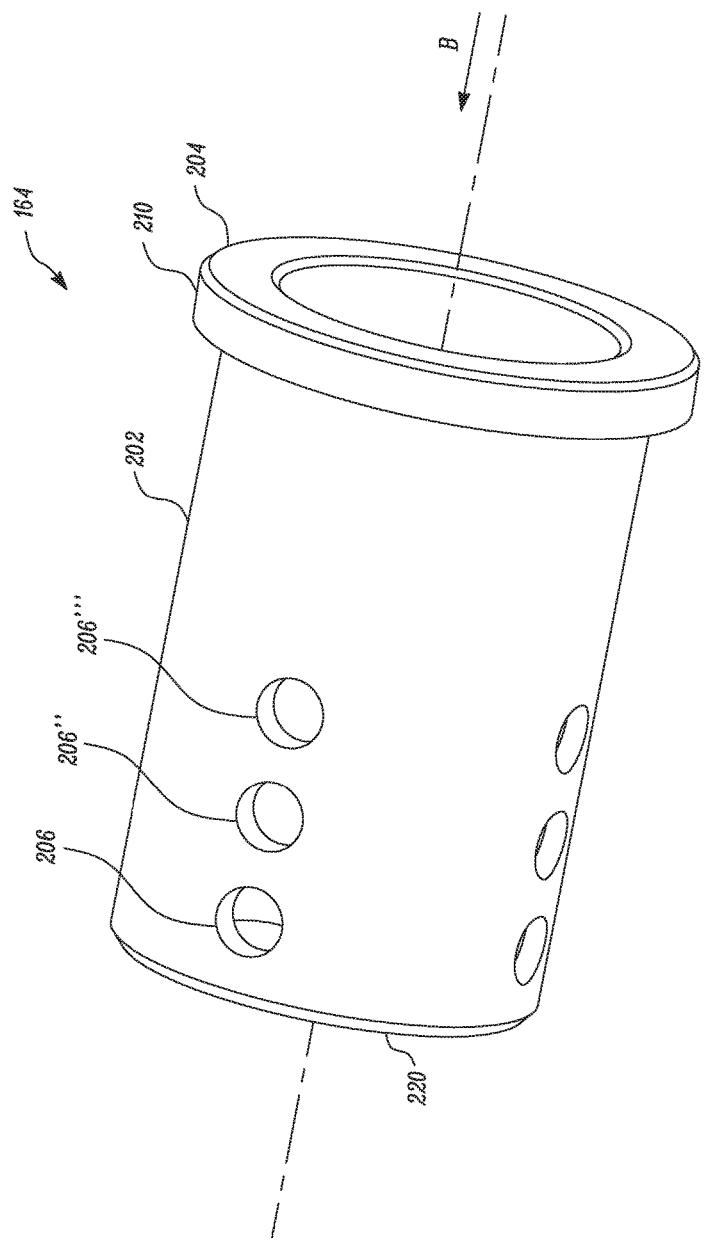
FIG. 5 is a bushing of the bracket assembly, in accordance with the concepts of the present disclosure.

Referring to FIG. 5, the bushing 164 includes a substantially cylindrical structure with a cylindrical portion 202. The cylindrical portion 202 includes an end 204 and a number of holes 206 (or a first hole 206', second hole 206", a third hole 206''') arranged on the cylindrical portion 202. The holes 206 are exemplarily three in number, however it is possible for the cylindrical portion 202 to include more or lesser number of holes. The holes 206 are longitudinally spaced apart from each other, although the holes 206 may be defined irregularly to each other on the cylindrical portion 202. In some implementation, the holes 206 are arranged on and along an axial direction (see direction, B) of the cylindrical portion 202, or along a length of the bushing 164.

When the bushing 164 is assembled with the bracket 156 (or with the first side plate 160), the cylindrical portion 202 is configured to be inserted and positioned into the opening 192. The holes 206 facilitate the bushing 164 to assume multiple positions, i.e. of the end 204 of the bushing 164 relative to the plate 160 (see FIGS. 6A, 6B, and 6C, discussed later). Further, the bushing 164 includes a lip portion 210 that extends radially outwardly from the end 204. The lip portion 210 is generally structured as a flange that, in some implementations, is adapted to abut against the plate 160 and restrict an axial movement of the bushing 164 relative to the plate 160 towards an outer space 214 (see direction C-C', FIGS. 6A, 6B, and 6C, with FIG. 6C depicting an outermost position of the bushings 164', 164" relative to the plates 160, 162, respectively). Additionally, the cylindrical portion 202 is configured to be inserted and positioned into the opening 192, along the axis 218 of the opening 192. Moreover, the multiple positions of the end 204 relative to the plate 160 may correspond to a variation of a distance between the end 204 and the plate 160, measured along the axis 218 of the opening 192. In some implementations, the holes 206 are structured to extend diametrically across the bushing 164, to be symmetrical about a common axis (axis 218) of the opening 192 and the bushing 164, and such that the holes are revealed symmetrically about a common axis (axis 218) of the opening 192 and the bushing 164.

As with the bushings 164', 164", 164''', 164'''', the collars 166 may exemplarily be four in number, one for each bushing 164. More specifically, the bracket assembly 112 may include a first collar 166', a second collar 166", a third collar 166''', and a fourth collar 166''''. The first collar 166' may be coupled to the first side plate 160 and be co-axial (axis 218) to the opening 192'; the second collar 166" may be coupled to the second side plate 162 and be co-axial to the second opening 192"; the third collar 166''' may be coupled to the first side plate 160 and be co-axial to the third opening 192'''; and the fourth collar 166'''' may be coupled to the second side plate 162 and be co-axial to the fourth opening 192''''. As with the discussions of the bushing 164, the forthcoming discussions may pertain to discussions of the first collar 166' alone, and it will be understood that these discussions will be equivalently be applicable to each of the second collar 166", the third collar 166''', and the fourth collar 166''''. Also, for ease in reference an understanding, the first collar 166' is simply referred to as a collar 166.

The collar 166 may be coupled to the plate 160 by welding, although it is possible for the collar 166 to the coupled to the plate 160 in an alternative manner, such as by use of industrial adhesives, snap-fit connections, etc., as may be contemplated by someone in the art. In one example, it is possible for the collar 166 to be engaged with the plate 160 threadably. In this regard, an inner wall of the opening 192 may include threads that may mate and comply with the threads of an outer surface of the collar 166. Also, in the deployed or the assembled state of the collar 166 with the bushing 164, the collar 166 is configured to be extended outwardly from the plate 160, such as towards the outer space 214. Such an extension of the collar 166 may be at substantial right angles to a plane of the plate 160. In some embodiments, it is possible for the collar 166 and the plate 160 to be integrally formed. The collar 166 may be cylindrical in structure, and a diameter of the collar 166 may be larger than a diameter of the cylindrical portion 202 of the bushing 164. In so doing, the collar 166 may encompass at least a portion of an outer surface of the cylindrical portion 202, when assembled. The collar 166 may include an aperture 222 that extends diametrically across so as to have an opening of the aperture 222 revealed symmetrically about an axis of the collar (or the common axis—axis 218—of the bushing 164 and the opening 192, once assembled). The aperture 222 is configured to be deployed in line with the one of the holes 206', 206", 206''' arranged on the cylindrical portion 202, in assembly.

An assembly obtained between the plates 160 the pivot pin 168, the bushing 164, and the collar 166, may be such that the bushing 164 passes through the opening 192 in the plate 160 with the lip portion 210 being positioned within the inner space 180, and an opposite end 220 of the bushing 164 being directed outwards (towards the outer space 214) of the plate 160 (or the bracket 156—see direction, C, FIG. 6A, 6B, 6C). The collar 166 may be coupled to the plate 160 by welding and be co-axial to the opening 192 and the bushing 164; the pivot pin 168 may be inserted and passed through the opening 192 across the bushing 164. An assembly of each of the components—the collar 166, the bushing 164, and the pivot pin 168, may be such that the aperture 222, one of the holes 206', 206", 206"' of the bushing 164, and the slot 200', fall in line with each other. In such a case, one of the fastener pins 170 may be assembled into the aperture 222, be passed through one of the holes 206', 206", 206"', and be drawn across the slot 200', to be revealed symmetrically oppositely, and be retained by one or more retaining nuts 226 thereof. As a result, with each of the aperture 222 and the slot 200', by being in selective engagement with one of the holes 206', 206", 206"', and by having one of the fastener pins 170 passed therethrough, facilitate the bushing 164 to assume multiple positions of the end 204 of the bushing 164 relative to the plate 160 by selectively aligning and engaging each of the holes 206', 206", 206"' with the aperture 222. It may be noted that these multiple positions or the number of positions of the end 204 (of the bushing 164) relative to the plate 160 are determined and based on the number of holes 206', 206", 206"' of the bushing 164. Moreover, the fastener pins 170 may be retainers adapted to pass through the aperture 222 and one of the holes 206', 206", 206"' to ascertain a position of the end 204 among the multiple positions and to retain the pivot pins 168', 168" with the bracket assembly 112.

Further, an arrangement of the second bushing 164" relative to the second plate 162 may remain similar as has been described above. Similarly, an arrangement of the bushings 164"', 164"" may remain similar as well, respectively to the openings 192"', 192"" of the plates 160, 162.

INDUSTRIAL APPLICABILITY

Referring to FIGS. 6A, 6B, and 6C, as the machine 100 operates over a worksite, for a period, it may happen that the implement 104 may require to be removed from the machine 100 and be assembled to another machine. Such a situation may arise because of machine downtime, machine maintenance, or because of an availability of another machine that is better equipped to handle an operation related to the implement 104. In some cases, it may also happen that the same machine 100 is required to be equipped with another implement, such as implement 104, since one type of operation performed by the implement 104 may come to an end, while another type of operation may need to start. During a transfer or a changeover of the implement 104 from a first machine to the machine 100, for example, it may happen that a width of the end 120 of the arm (or stick 110) may be unable to comply with a distance, such as distance $W_1$ (FIG. 3) existing between plates 160, 162. In some cases, it may happen that the width of the end 120 is much lesser than the distance $W_1$ (FIG. 3), and if the end 120 were still assembled with the bracket assembly 112, gaps may exist between the end 120 of the stick 110 and the bracket assembly 112, leading to increased chances of component play and consequent component damage. Since it is preferred for high productivity work cycles to avoid such situations, and also because there is a desire to lessen time and effort during such implement or machine changeovers, the bushing 164 of the present disclosure is applied to the bracket assembly 112.

In an exemplary changeover condition, an exemplary first machine may include the implement 104, provided with the bracket assembly 112. If the machine were to change and the implement 104 were to be transferred to a new machine, such as machine 100, an operator may first unfasten the fastener pins 170', 170", 170"', 170"", coupled to each of the collars 166', 166", 166"', 166"". Thereafter, the operator may pull out the pivot pins 168', 168" from the bracket 156 by any conventional method, such as by hammering against one end of the pivot pins 168', 168" and drawing the pivot pins 168', 168" from the other end. By freeing the bracket 156 of the pivot pins 168', 168" in such a manner, an end of the stick of the exemplary first machine may be removed from the bracket assembly 112. Next, the operator may cause the end 120 of the stick 110 of the new machine, such as the machine 100, to be extended into the inner space 180. As the pin receiving portion 196 of the end 120 of the stick 110 and a pin receptor 230 (see FIG. 2) at the end 140 of the attachment member 130 is respectively brought into alignment with the first pair of aligned openings 192a and second pair of openings 192b, the operator may gauge any difference in a width of the ends 120, 140 relative to the respective distances between the first pair of aligned openings 192a and the second pair of aligned openings 192b.

Referring to FIGS. 6A, 6B, and 6C, according to the width gauged, the operator may insert the bushings 164', 164", 164"', 164"" into each of the openings 192', 192", 192"', 192"" and opt for a bushing position that complies with the distances and clears any gaps between each of the aligned openings 192a, 192b and the ends 120, 140, respectively. However, if the bushings 164', 164", 164"', 164"" were already present in the bracket 156, the operator may need to only reposition an originally held alignment of the holes of the bushing 164 to a new alignment, depending upon the widths of the ends 120, 140. In an example, if a wider stick end 120 needs to be assembled, and it were noticed that a hole (such as hole 206'), farther to the end 204, were originally aligned to the aperture 222 of the first collar 166' and the slot 200', the operator may move the bushing 164 (in a direction, C, i.e. away from the inner space 180 towards the outer space 214) such that a hole 206" (or hole 206"') closer to the end 204 may align with the aperture 222 and the slot 200'. In an embodiment, such a re-alignment may be performed even for the second bushing 164" assembled into the second opening 192", as well. By re-aligning the bushings 164', 164", a distance between the lip portions 210 of the two bushings 164', 164" may increase, allowing the wider stick end 120 to be accommodated into the inner space 180, between the first pair of aligned openings (and the lip portions 210). Thereafter, the operator may assess whether a similar re-alignment needs to be performed for the third bushing 164"' and the fourth bushing 164"" as well, and such may be performed depending upon a width of the attachment member 130. Once appropriately re-aligned, the ends 120, 140 of the stick 110 and the attachment member 130 may be brought into the inner space 180, between the aligned openings 192a, 192b, the pivot pins 168 pushed into the respective pair of aligned openings 192a, 192b, the fastener pins 170 respectively secured (or locked) by insertion into the collars 166 and the bushings 164 (through the respective apertures and the holes), and subsequently, the machine 100 (with the implement) may be prepared for a next level operation, or a continued operation.

By facilitating such re-alignments, the bushings 164 may be modularly used for multiple machines with different linkage assemblies (and also different implements). Moreover, by use of the bracket assembly 112, a time required for an implement changeover, or a machine changeover, is considerably reduced when compared to situations when the entire bracket assembly 112 had to be removed for assembling an implement, such as implement 104, with a different machine. Furthermore, with use of the bushings 164, a conventional need involving the inventory and use of multiple bushings may be avoided. This is because one bushing applicable for a characteristic stick width may be unable to accommodate a different stick width from another linkage assembly (of perhaps another machine). Such a deficiency generally necessitated multiple bushing to be stored and applied appropriately to serve and accommodate different widths of different stick ends and attachment member ends. By way of the bushings 164 such a situation may be well avoided, and rather, machines or linkage assemblies with different stick widths (or arm widths) may repeatedly use the bracket assembly for coupling an implement to the sticks.

It should be understood that the above description is intended for illustrative purposes only and is not intended to limit the scope of the present disclosure in any way. Thus, one skilled in the art will appreciate that other aspects of the disclosure may be obtained from a study of the drawings, the disclosure, and the appended claim.

What is claimed is:

1. A bracket assembly for coupling an implement to an arm of a machine, the bracket assembly comprising:
   a bracket including
      a plate defining an opening therethrough; and
      a collar extending from the plate and being fixed to the plate co-axially with the opening, the collar defining a first aperture and a second aperture therethrough, the first aperture being diametrically opposed to the second aperture across the collar;
   a bushing disposed within the opening, the bushing including a cylindrical portion with an end, and defining a plurality of holes arranged on and along an axial direction of the cylindrical portion, the plurality of holes being longitudinally spaced apart from each other along the axial direction of the cylindrical portion, each hole of the plurality of holes corresponding to a unique position among multiple positions of the end relative to the plate; and
   a retainer disposed through each of the first aperture, a selected hole of the plurality of holes, and the second aperture to effect a selected position of the multiple positions of the end relative to the plate.

2. The bracket assembly of claim 1, further comprising a pin inserted through the opening to couple the arm with the bracket, the pin defining a slot therethrough,
   wherein the retainer is also disposed through the slot.

3. The bracket assembly of claim 1, wherein the plurality of holes is arranged along a length of the bushing.

4. The bracket assembly of claim 1, wherein the plate is a first plate and the opening is a first opening,
   the bracket further includes a second plate with a second opening, and
   the pin passes through each of the first opening and the second opening to couple the arm to the bracket.

5. The bracket assembly of claim 4, wherein the bushing is a first bushing,
   the bracket assembly further includes a second bushing disposed within the second opening, and
   the second bushing includes a cylindrical portion with an end, and a plurality of holes arranged along the cylindrical portion, the plurality of holes of the second bushing being longitudinally spaced apart from each other.

6. The bracket assembly of claim 4, wherein the first opening and the second opening define a first pair of aligned openings, the bracket including a second pair of aligned openings.

7. The bracket assembly of claim 1, wherein the bushing further includes a lip portion extending radially outwardly from the end, the lip portion being configured to abut against the plate and restrict an axial movement of the bushing relative to the plate.

8. The bracket assembly of claim 7, wherein an entirety of an external surface of the cylindrical portion extending from the lip to one hole of the plurality of holes is cylindrical.

9. The bracket assembly of claim 8, wherein an internal surface of the collar faces the bushing along a radial direction, the radial direction being transverse to the axial direction, and
   an entirety of the internal surface of the collar is cylindrical.

10. The bracket assembly of claim 1, wherein the cylindrical portion is disposed within the opening along an axis of the opening, and the multiple positions of the end relative to the plate correspond to a variation of a distance between the end and the plate, measured along the axis of the opening.

11. A linkage assembly for a machine, the linkage assembly comprising:
    an arm;
    a bracket pivotally coupled to the arm, the bracket being configured to couple an implement to the arm, the bracket including;
       a base structure configured to couple to the implement;
       a plate defining an opening therethrough, the plate being pivotally coupled with the arm; and
       a collar extending from the plate and being fixed to the plate co-axially with the opening, the collar defining a first aperture and a second aperture therethrough, the first aperture being diametrically opposed to the second aperture across the collar;
    a bushing disposed within the opening, the bushing including a cylindrical portion with an end, and defining a plurality of holes arranged on and along an axial direction of the cylindrical portion, the plurality of holes being longitudinally spaced apart from each other along the axial direction of the cylindrical portion, each hole of the plurality of holes corresponding to a unique position among multiple positions of the end relative to the plate;
    a pin inserted through the opening to couple the arm with the bracket, the pin defining a slot therethrough; and
    a retainer disposed through each of the first aperture, a selected hole of the plurality of holes, the slot, and the second aperture to effect a selected position of the multiple positions of the end relative to the plate.

12. The linkage assembly of claim 11, wherein the plate is a first plate and the opening is a first opening,
    the bracket further includes a second plate with a second opening, and
    the pin passes through each of the first opening and the second opening to couple the arm to the bracket.

13. The linkage assembly of claim 12, wherein the first opening and the second opening define a first pair of aligned openings, the bracket including a second pair of aligned openings.

14. The linkage assembly of claim 12, wherein the bushing is a first bushing,
    the linkage assembly further includes a second bushing disposed within the second opening, and
    the second bushing includes a cylindrical portion with an end, and a plurality of holes arranged along the cylindrical portion, the plurality of holes of the second bushing being longitudinally spaced apart from each other.

15. The linkage assembly of claim 11, wherein the bushing further includes a lip portion extending radially outwardly from the end, the lip portion being configured to abut against the plate and restrict an axial movement of the bushing relative to the plate.

16. The linkage assembly of claim 15, wherein an entirety of an external surface of the cylindrical portion extending from the lip to one hole of the plurality of holes is cylindrical.

17. The linkage assembly of claim 16, wherein an internal surface of the collar faces the bushing along a radial direction, the radial direction being transverse to the axial direction, and an entirety of the internal surface of the collar is cylindrical.

\* \* \* \* \*